(12) United States Patent
Ericsson et al.

(10) Patent No.: US 7,565,658 B2
(45) Date of Patent: Jul. 21, 2009

(54) HIDDEN JOB START PREPARATION IN AN INSTRUCTION-PARALLEL PROCESSOR SYSTEM

(75) Inventors: Tomas Ericsson, Kista (SE); Per Anders Holmberg, Stockholm (SE); Fredrik Strandberg, Bromma (SE); Lars Winberg, Stockholm (SE); Nils Ola Linnermark, Johanneshov (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 773 days.

(21) Appl. No.: 10/491,880

(22) PCT Filed: Oct. 8, 2001

(86) PCT No.: PCT/SE01/02183

§ 371 (c)(1),
(2), (4) Date: Sep. 17, 2004

(87) PCT Pub. No.: WO03/032154

PCT Pub. Date: Apr. 17, 2003

(65) Prior Publication Data

US 2005/0060711 A1    Mar. 17, 2005

(51) Int. Cl.
G06F 9/46 (2006.01)
G06F 15/173 (2006.01)

(52) U.S. Cl. .................. 718/107; 718/102; 718/103; 709/240

(58) Field of Classification Search .......... 718/100, 718/107, 102–103; 709/240
See application file for complete search history.

(56) References Cited

U.S. PATENT DOCUMENTS

| | | | | |
|---|---|---|---|---|
| 4,435,758 A | * | 3/1984 | Lorie et al. | 712/22 |
| 4,493,026 A | * | 1/1985 | Olnowich | 711/128 |
| 5,742,782 A | * | 4/1998 | Ito et al. | 712/210 |
| 5,799,179 A | * | 8/1998 | Ebcioglu et al. | 712/234 |
| 6,185,675 B1 | * | 2/2001 | Kranich et al. | 712/238 |
| 2001/0039558 A1 | * | 11/2001 | Kakisada et al. | 709/102 |
| 2003/0014474 A1 | * | 1/2003 | McKaig et al. | 709/108 |

OTHER PUBLICATIONS

Vanderwiel, S.P., et al., Data Prefetch Mechanisms. ACM Computing Surveys, vol. 32, No. 2, Jun. 2000. See page 175, col. 2 and p. 178, col. 2.

Kurian John L., et al., A Comparative Evaluation of Software Techniques to Hide Memory Latency. Proceedings of the 28th Annual Hawaii International Conference on System Sciences—1995. See p. 229, col. 2 and p. 231, cols. 2-3.

* cited by examiner

Primary Examiner—Van H Nguyen
Assistant Examiner—Camquy Truong

(57) ABSTRACT

The read latency caused by job start preparation of a future job is at least partly hidden within the current job by reading information for job start preparation of the future job integrated with the execution of the current job. Instructions for job start preparation are preferably instrumented (701) into the current job and executed (702), whenever possible, in parallel with the instructions of the current job. The integrated job start preparation may include table look-ups, register file updating, instruction fetching and preparation. If the scheduled job order is allowed to change during execution, it is typically necessary to test (703) whether the next job is still valid before starting the execution, it is typically necessary to test (703) whether the next job is still valid before starting the execution of the next job and take appropriate actions (704; 705, 706) depending on the outcome of the test. In addition to reduced job start preparation time, unused slots in the instruction-parallel execution of the current job may be filled up by the added read instructions, thus providing more efficient utilization of the multiple functional execution units of the processor.

22 Claims, 6 Drawing Sheets

HIDDEN JOB START PREPARATION IN AN INSTRUCTION-PARALLEL PROCESSOR SYSTEM

TECHNICAL FIELD OF THE INVENTION

The present invention generally relates to computer and processor technology, and more particularly to a technique for efficient job start preparation and register file update in a processor.

BACKGROUND OF THE INVENTION

With the ever-increasing demand for faster and more effective computer systems naturally comes the need for faster and more sophisticated electronic components. The computer industry has been extremely successful in developing new and faster processors. The processing speed of state-of-the-art processors has increased at a spectacular rate over the past decades. The access time of memory circuits, however, has not been able to improve at the same rate. In fact, the ratio between memory access time and clock cycle time for execution has increased rapidly during the past 10 to 15 years, and is expected to increase even further in the future. This means that memory will continue to be the limiting factor for overall system performance. The relatively long access time for retrieval of information from main memory generally means that the processor has to spend time merely waiting for information that is required during execution. This waiting time is often referred to as memory latency or read latency.

A particular procedure that is strongly affected by the memory latency in conventional computer systems is the job start preparation of jobs to be executed by the processor. Typically, a number of job records are buffered in a memory-allocated queue, awaiting processing by the computer system. As soon as the processor is ready to process a job record from the queue, the relevant record information such as instruction address information and input arguments for the job, is read from the queue into the register file of the processor so that job execution can be initiated. This procedure of updating the register file, as part of the job start preparation, is usually performed by an operating system routine as a separate activity in between jobs.

However, due to the memory latency, the processor will enter a "stall state" while waiting for the required information to enter the register file from the memory, thus wasting valuable execution time and resources during the job start preparation. In many cases, the jobs are relatively short, less than 100-200 clock cycles, and with memory access times of up to 100 clock cycles it is evident that the register file update will occupy a significant part of the overall execution time. This is a general problem in all types of processors, ranging from the simplest processors to modern instruction-parallel and pipelined processors.

One way of reducing the job start preparation time is to use multiple register files that can be switched in and out quickly. While the processor is actively operating towards one of the register files, another currently switched-out register file is filled with information. Once the processor has completed execution of the current job, the previously prepared register file is now switched into operation with the processor. Although this solution provides a quite satisfactory solution to the memory latency problem at job start, the hardware overhead is quite significant and the extra register files, generally requires increased on-chip area. The increase in chip area gives rise to a corresponding increase of the distance for data transport over the chip, which in turn affects the access time.

In addition, depending on the system configuration, the job start preparation may also involve a number of table look-ups for determining the next job and for retrieving some of the job information to be transferred to the register file. Since each table look-up is associated with its own memory latency, it is evident that a whole series of table look-ups will contribute strongly to the overall memory or read latency experienced by a job.

SUMMARY OF THE INVENTION

The present invention overcomes these and other drawbacks of the prior art arrangements.

It is a general object of the present invention to provide a simple, yet robust and efficient solution for reducing the average job start preparation time in a processor.

It is a particular object of the invention to provide an efficient mechanism for updating the register file of a processor between jobs.

It is also an object of the invention to mitigate the negative effects of table look-ups required in the job start preparation.

These and other objects are met by the invention as defined by the accompanying patent claims.

The invention is based on the recognition that, in an instruction-parallel processor system, the memory or read latency problem can be alleviated by integrating at least parts of the job start preparation of a future job with the execution of the current job. By reading information required in the job start preparation of a future job integrated with the execution of the current job, the corresponding read latency may be effectively hidden within the current job For example, the process of reading of job information related to the next job into the register file and/or into control registers of the processor may be integrated with the execution of the current job. Instead of using a special operating system routine that is activated at the end of each job for the purpose of reading the next job, read instructions for reading the next job or parts thereof are instrumented within the current job and executed, whenever possible, in parallel with the instructions of the current job. In this way, the read latency for updating the register file is at least partly hidden within the current job, substantially reducing the job start preparation time for the next job.

In order to completely hide the read latency if the memory access time is longer than the average job execution time, it is possible to initiate the register file updating for the next job more than one job in advance. The required job information may be pre-loaded from a slower memory such as the main memory into a faster intermediate memory buffer prior to the execution of the current job. The job information is then read from the intermediate memory buffer into the register file integrated with the execution of the current job.

Another important read process in the job start preparation that can be integrated with the execution of the current job is defined by the table look-up or look-ups required for retrieving job information to be transferred to the register file. However, if the memory access time for the table look-ups exceeds the average job execution time, it may be beneficial to initiate the table look-ups further in advance, possibly distributed over several preceding jobs.

It should also be understood that the job start preparation integrated with the current job may be related to more than one future job, and that different stages of job start preparation are executed for different future jobs.

In addition to the hidden read latency, the invention offers a further advantage in that unused operation slots in the instruction-parallel execution of the current job may be filled up by the added read instructions, thus providing more efficient utilization of the multiple functional execution units of the processor. The integration of the added read instructions with the instructions of the current job is preferably based on the register file utilization, as analyzed by the program code compiler.

If the scheduled job order in the job queue is allowed to change during execution, the job start preparation of the next job will be speculative since the "next job" that is being prepared and loaded into the register file may be withdrawn or replaced by a new job before it is ready for execution. Consequently, it is necessary to test whether the next job is still valid before starting the execution of the next job. If the next job is not valid, for example because it has been replaced by a new job with higher priority, the speculated "next job" will not be executed. Instead, the register file content will be flushed and replaced by the necessary information belonging to the new job.

The invention is generally applicable in instruction-parallel processors, such as superscalar pipeline processors or Very Long Instruction Word (VLIW) processors.

The invention offers the following advantages:
Reduced job start preparation time;
Hidden read latency;
Efficient register file update;
Unused slots can be filled up to provide more efficient utilization of the functional units of the processor; and
Improved utilization of the execution resources.

Other advantages offered by the present invention will be appreciated upon reading of the below description of the embodiments of the invention.

BRIEF DESCRIPTION OF THE DRAWINGS

The invention as well as further objects and advantages thereof will be appreciated by reference to the description below when taken together with the drawings, in which.

DETAILED DESCRIPTION OF EMBODIMENTS OF THE INVENTION

The invention will first be described with reference to a message-based computer system. It should though be understood that the invention is not limited thereto, as will be explained later on.

Figure 1:
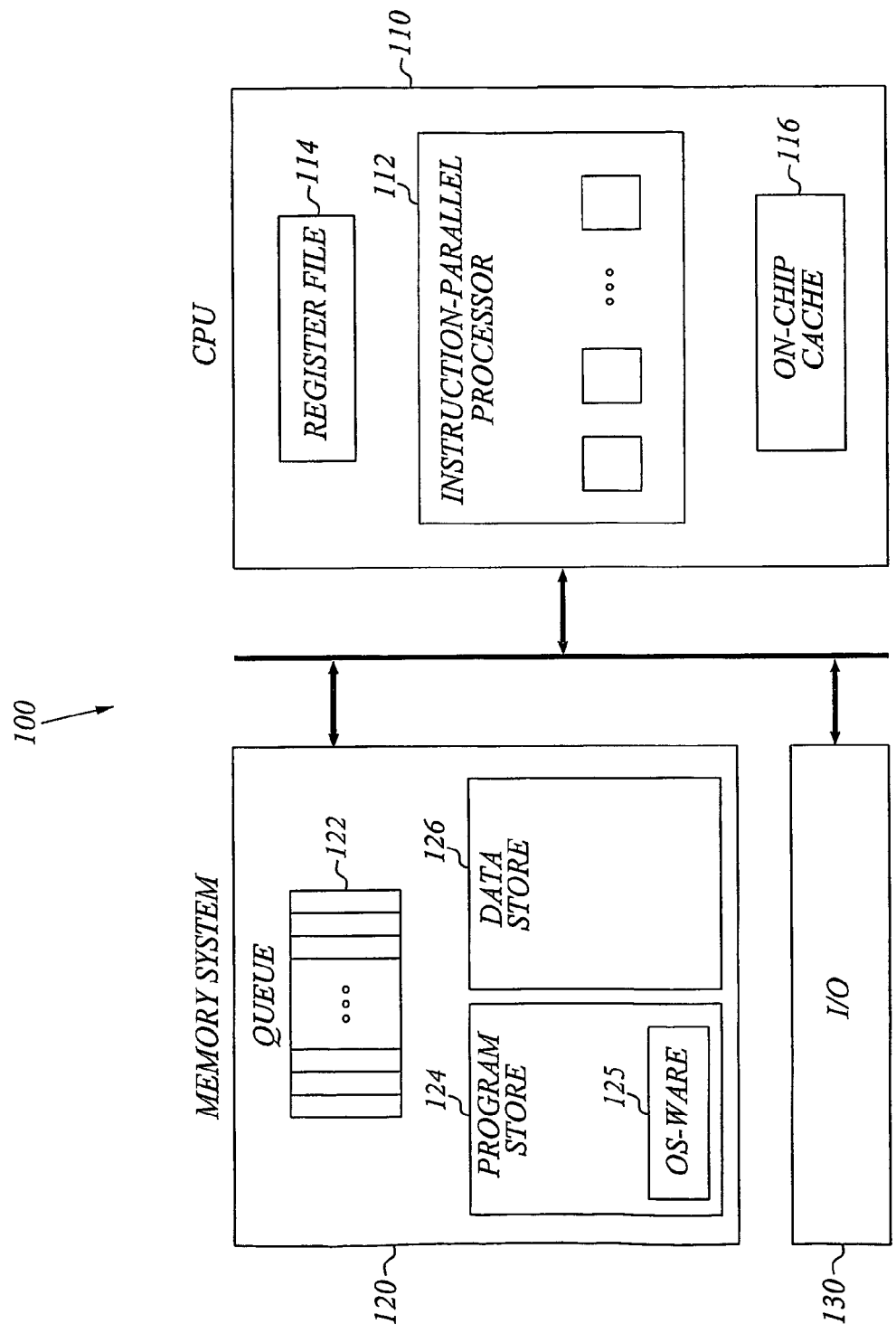
FIG. 1 is a schematic block diagram of an example of a computer system in which the invention can be implemented.

FIG. 1 is a schematic block diagram of an example of a computer system in which the invention can be implemented. The system 100 basically comprises a central processing unit (CPU) 110, a memory system 120 and a conventional input/output (I/O) unit 130. The CPU 110 comprises an instruction-parallel processor 112 capable of executing several instructions in parallel, a register file 114 and an optional on-chip cache 116. In this example, the register file 114 includes a conventional program counter as well as registers for input operands required for execution. The memory system 120 comprises a signal message queue 122, a program store 124 including operating system (OS) software 125, and a data store 126.

Externally generated job messages as well as internal job messages are generally buffered in the signal message queue 122, awaiting processing by the CPU 110. As soon as the CPU 110 is ready to process a new message from the message queue 122, the relevant message information, such as instruction address information and input arguments required for the job, is copied from the message queue 122 into the register file 114 of the CPU 110 so that execution of the corresponding job can be initiated.

Instead of using a special operating system routine that is activated at the end of each job for reading the relevant information for the next job into the register file, the invention proposes that read instructions for reading the next job are instrumented within the current job and executed, whenever possible, in parallel with the instructions of the current job. In this way, the next job, or as much as possible thereof, can be loaded into the register file integrated with the execution of the instructions of the current job. This effectively minimizes the read latency for updating the register file and hence reduces the job start preparation time for the next job.

Consequently, the additional hardware required by the solution with multiple register files has been replaced by ordinary read instructions that are effectively integrated in the current job. A major advantage compared to the hardware solution with multiple register files is that the design is much simpler, easier to verify and less risky to develop. The simple design also leads to increased raw-execution performance.

It should be understood that the invention is not limited to the implementation shown in FIG. 1, but can be implemented in any computer system based on an instruction-parallel processor such as a superscalar pipeline processor or a Very Long Instruction Word (VLIW) processor.

For a better understanding of the general operation of an instruction-parallel processor, reference will now be made to FIGS. 2 and 3, which are schematic logical views of a superscalar architecture and a VLIW architecture, respectively.

Figure 2:
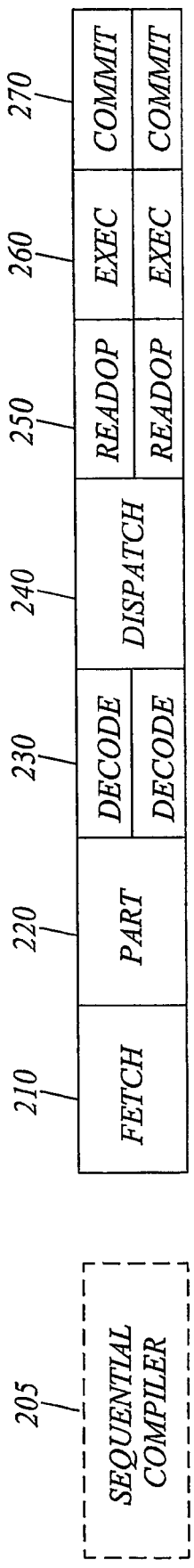
FIG. 2 is a schematic logical view of a superscalar pipeline architecture.

FIG. 2 is a schematic logical view of a superscalar pipeline 200 with an associated compiler 205. The superscalar pipeline basically comprises an instruction fetch stage 210, an instruction partitioning stage 220, a decode stage 230, a dispatch stage 240, an operand read stage 250, an execution stage 260 and a commit stage 270. The superscalar pipeline includes multiple functional units in various stages (as indicated in FIG. 2) so that several instructions can be decoded and executed in parallel. In a two-way superscalar pipeline, two instructions can be decoded and executed in parallel. In a four-way superscalar pipeline, four instructions can be executed in parallel.

For execution of a job or task, defined as a sequence of instructions initiated from a job message in the job message queue, the start address of the instruction sequence is taken from the program counter in the register file, and the corresponding instructions are fetched from the memory structure, typically from an on-chip instruction cache, by the fetch stage 210. For example, the fetch stage 210 fetches a cache line from the instruction cache each cycle. The cache line is partitioned into a number of instructions, such as assembler instructions, in the partitioning stage 220. The instructions are then decoded, for example from assembler instructions into micro code instructions, in the decode stage 230. The decoded instructions are passed on to the dispatch stage 240, which performs instruction scheduling and parallel dispatch of the instructions for execution by the different execution units. However, before starting instruction execution, the operand read stage 250 receives the decoded instructions and prepares them for execution by loading the required input operands, also referred to as input arguments, from the register file. In the execution stage 260, the decoded and prepared instructions are executed in a set of execution units. The instructions are generally executed out-of-order, independent of the order specified in the program code. In the commit stage 270, the execution results of the instructions are committed in order, using conventional re-ordering mechanisms. This means that the execution result of an instruction is not committed, i.e. written back to the register file, hardware or control registers, data store and/or signal message queue, until the results of all previous instructions have been committed.

According to the invention, the compiler 205, or possibly a programmer, adds read instructions for reading at least part of the next job to the register file to at least one job instruction sequence. Next, the compiler 205, or a post-optimizer, performs code optimization by re-arranging the read instructions together with the other instructions in the job instruction sequence in a suitable manner. Preferably, the instructions are re-arranged based on register file utilization. This generally means that the compiler 205 keeps track of when the various registers in the register file no longer are needed by the current job, and thus are available for input arguments relating to the next job, and places the read instructions in the code accordingly. The compiled code is however still a sequential sequence of instructions. The parallelism is extracted during run-time, when the dispatch stage 240 dispatches the instructions to the multiple execution units for parallel execution. The next job message is available from the message queue of the computer system during execution of the current job so that the relevant message information can be copied into the register file. Preferably, the processor has a register holding a pointer that points to the next job.

An alternative architecture for exploiting instruction-level parallelism is the Very Long Instruction Word (VLIW) architecture. The objective of the VLIW architecture is to eliminate the complex hardware-implemented instruction scheduling and parallel dispatch used in modern superscalar processors. In the VLIW approach, this is performed by an instruction-parallelizing compiler at compilation of the program code. For basic information on VLIW architectures and compilers reference is made to the workshop material *Implementing an Experimental VLIW Compiler* by M. Moudgill et al., High-Performance Computer Architecture Conference, San Antonio, February 1997, pp. 1-30, and U.S. Pat. No. 5,742,782.

Figure 3:
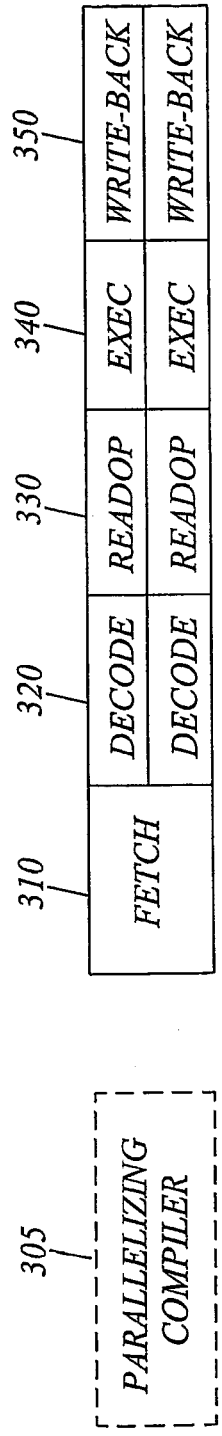
FIG. 3 is a schematic logical view of a Very Long Instruction Word (VLIW) processor architecture.

FIG. 3 is a schematic logical view of a VLIW processor 300 and an associated parallelizing compiler 305. The VLIW processor 300 comprises a fetch stage 310, a decode stage 320, an operand read stage 330, an execution stage 340 and a write-back stage 350. The VLIW processor comprises multiple functional units ( as indicated in FIG. 3) for allowing parallel execution. The instruction-level parallelism is however first exploited by the parallelizing compiler 305 that groups instructions that are executable in parallel into Very Long Instruction Words. In a VLIW architecture, the fetch stage 310 typically fetches a VLIW word, containing several primitive instructions, each cycle. Once the instructions of the VLIW word have been decoded in the decode stage 320 and prepared for execution in the read operand stage 330, the entire VLIW word may be executed in parallel in the execution stage 340. Finally, the execution results are written-back in the write-back stage 350.

Since the compiler 305 assembles only those instructions that are actually executable in parallel into a VLIW word, there is generally no out-of-order execution, and hence there is no need for any commit stage with reordering functionality.

Figure 4:
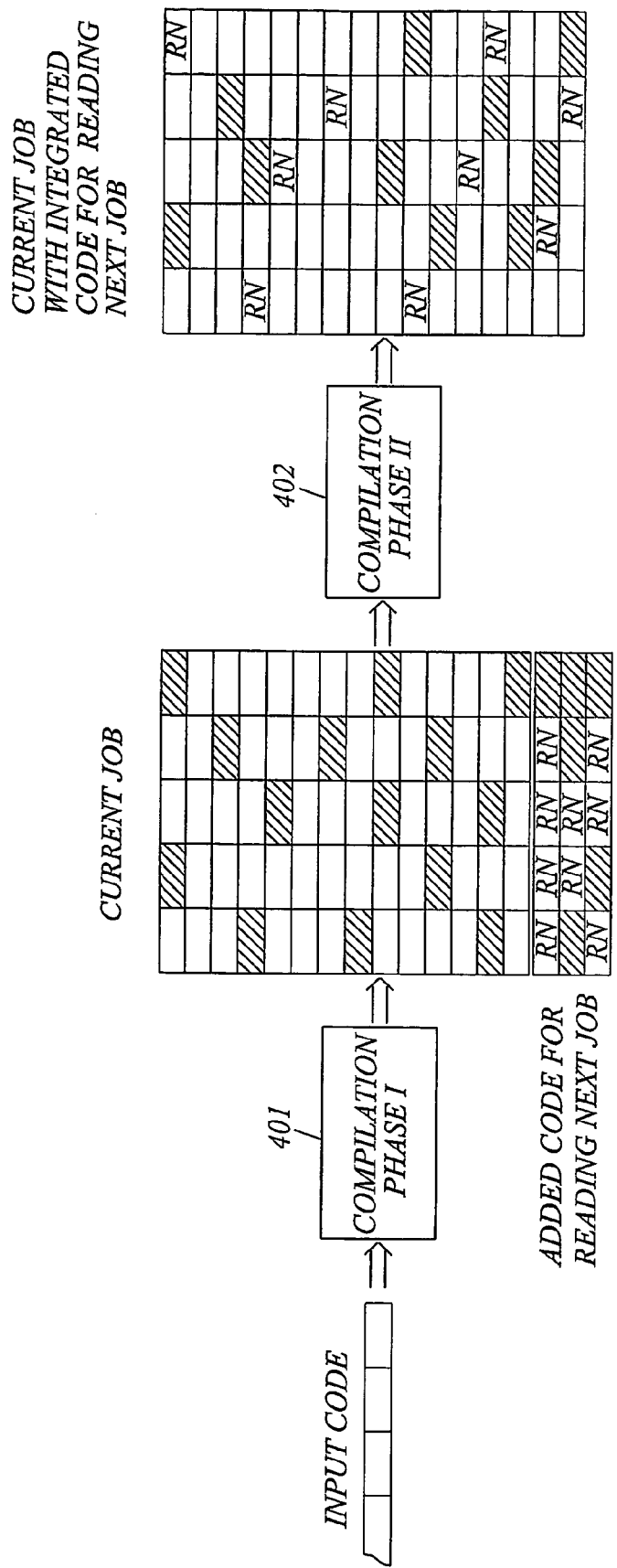
FIG. 4 is a schematic diagram illustrating an example of compiler-assisted integration of read instructions for reading a next job with the instructions of a current job.

FIG. 4 is a schematic diagram illustrating an example of compiler-assisted integration of read instructions for reading a next job with the instructions of a current job in a VLIW architecture such as that shown in FIG. 3.

The input code is provided as a sequence of instructions to the VLIW compiler. In the first compilation phase 401, the compiler translates the input code relating to a job into object code and at the same time parallelizes the code by grouping instructions that can be executed in parallel into VLIW words. Each VLIW word is capable of holding multiple primitive instructions, but typically all available instruction slots are not filled due to the limited instruction-level parallelism of the input code sequence. Empty instruction slots are indicated by "hatching" in FIG. 4.

The compiler also adds read instructions RN for reading the next job, or parts thereof, at the end of the current job. In practice, the compiler detects the beginning and end of a job in the given input code sequence, and adds the appropriate code, arranged in one or more VLIW words, for reading the next job at the end of the current job. Here, a job is simply defined as a confined instruction sequence for performing a specific function or a set of functions.

In the second compilation phase 402, which is often referred to as the optimization phase, the compiler or possibly a post-optimizer re-arranges the instructions for code optimization purposes. Basically, the compiler tries to parallelize the code optimally by assembling as many instructions, or operations, as possible into each VLIW word. Such parallelism may be uncovered by performing software pipelining, memory disambiguation techniques, loop-rewrite optimizations and/or even through scheduling of code speculatively across basic blocks. In this context, the added read instructions RN for reading the next job are re-arranged within the current job sequence to fill available instruction slots, whenever possible. It is though important to keep in mind that a given register in the register file becomes available for input arguments relating to the next job only when the instructions of the current job no longer needs the contents of that register. In addition, there may be memory system specific factors that affect the placement of the read instructions. For some memory systems, it may be advantageous to place the read instructions adjacent to each other. For other memory systems, however, it is important not to place the read instructions RN too close to each other or other memory operations, since the performance of the memory system may be degraded if there are too many simultaneous read operations.

When the VLIW words are dispatched for parallel execution by the VLIW processor, the reading of the next job will be an integrated part of the execution of the current job. Consequently, the read latency for starting the next job will be hidden within the current job. In addition, some of the available slots that otherwise would be empty are now filled by the added read instructions RN.

It should be understood that the compiler used by the invention is not necessarily a high-level compiler, but could actually be a binary compiler that translates and processes existing assembler code.

For additional information on compiler design and optimization, reference is made to *Advanced Compiler Design and Implementation* by S. Muchnick, 1997, pp. 531-576.

In order to more clearly understand the performance gain obtained by this aspect of the invention, compared to conventional job starts, reference will now be made to FIGS. 5A-B.

Figures 5A, 5B:
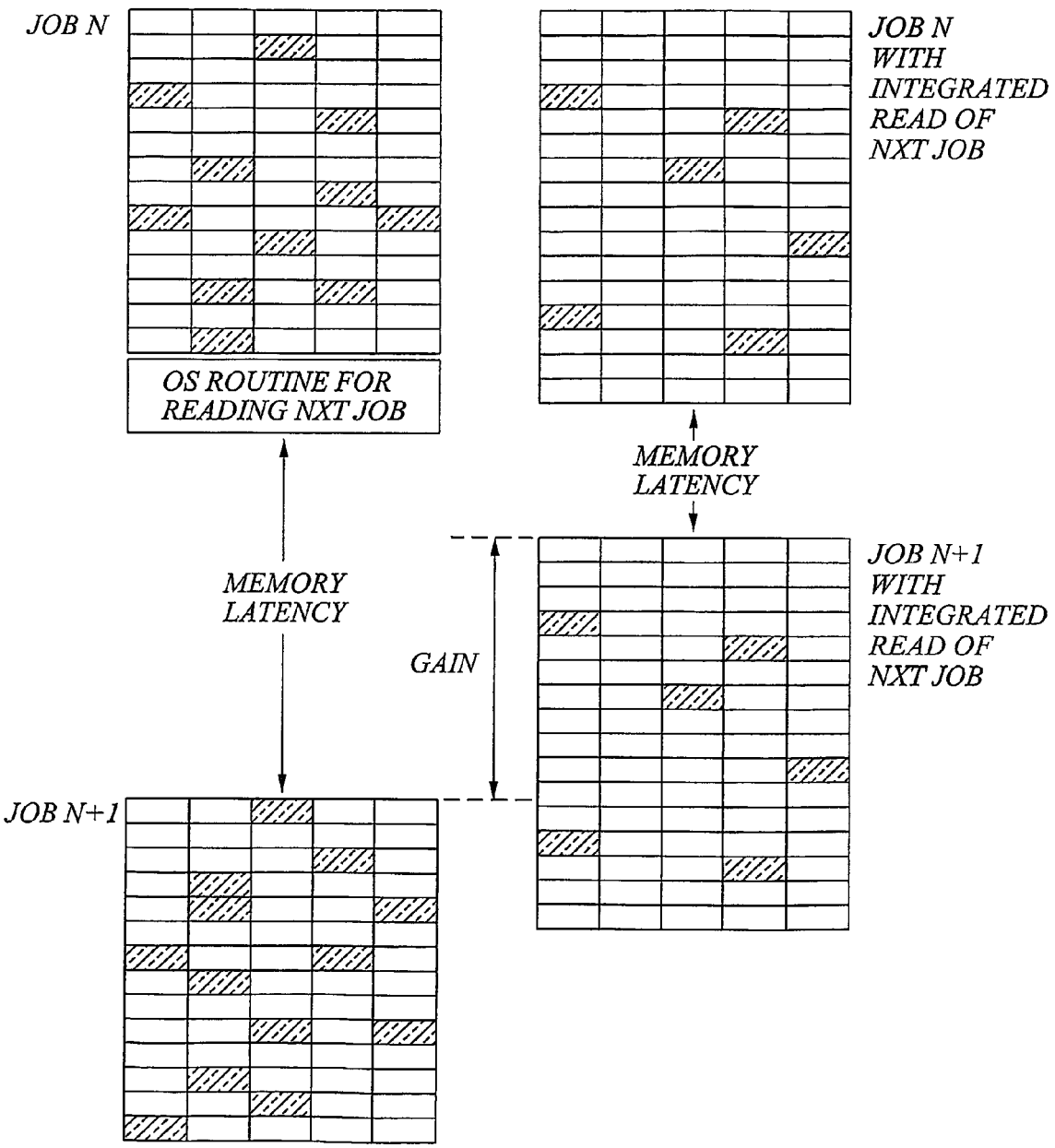
FIGS. 5A-B are schematic diagrams illustrating the performance gain obtained by the invention compared to the prior art technique.

FIG. 5A is a schematic diagram illustrating conventional job execution and job start preparation in a VLIW architecture with a single register file. Jobs are illustrated in VLIW format, assuming that entire VLIW words are dispatched for parallel execution. In the prior art, the instructions of a given instruction sequence, job N, are executed until the end of the sequence. At the end of job N, the operating system (OS) takes over and executes an OS routine for reading the next job into the register file. In general, this involves reading instruction address information and input operands from the memory system to update the program counter and the other registers of the register file. Due to the memory latency, the processor will now enter a stall state, simply waiting for the required message information to be retrieved from the memory into the register file. The processor can not start execution of the next job, job N+1, until the register file has been updated. In many applications, the memory latency for updating the register file may be of the same order as the execution of an entire job.

FIG. 5B is a schematic diagram illustrating job execution and job start preparation according to the invention. The reading of the next job is integrated in the current job, allowing earlier register file update as well as fewer empty instruction slots. Since the updating of the register file, or at least parts thereof, can be initiated earlier, at least part of the memory latency will be hidden within the current job. Naturally, this means that the actual execution of the next job N+1 can be initiated earlier, compared to the prior art arrangement. The comparatively fewer empty instruction slots in the VLIW words due to the added read instructions also contributes to a saving in execution time, since the multiple execution units of the processor will be utilized more efficiently. Consequently, the performance gain offered by the invention partly originates from the hidden memory latency and partly from the increased parallelism of the execution units. Please note that the execution length of the job with integrated job start preparation of the next job in FIG. 5B is shorter thin the execution length of the original job together with the OS job start routine in FIG. 5A.

If the number of input operands varies from job to job, it is advantageous to standardize the mechanism and only read a predetermined limited number of input operands into the register file as an integrated part of the current job. The convention will typically be a trade-off between job messages with many input operands and job messages with few input operands. For job messages with many input operands, the remaining operands will be copied into the register file during execution of the next job, preferably at the beginning of the next job, or by an operating system routine.

The computer system may also be provided with a set of control registers for holding additional job information, such as maximum and minimum addresses, required in the execution. This additional information for the next job is preferably also read into the control registers integrated with the current job.

If the memory access time for updating the register file is longer than the average job execution time, it is possible to initiate the register file updating for the next job more than one job in advance and provide intermediate storage of the required job information in a dedicated memory buffer until the processor starts executing the job immediately prior to the next job. This means that the required job information is pre-loaded from the job queue, which typically is implemented in a slower memory such as the main memory, into a faster intermediate memory buffer prior to the execution of the current job, for example integrated with the execution of a job preceding the current job. The job information is then read from the intermediate memory buffer into the register file integrated with the execution of the current job. With an offset of several jobs, several intermediate memory buffers may be provided for allowing step-wise, pipelined transfer of job information between the intermediate memory buffers and finally into the actual register file. The intermediate memory buffer or buffers are preferably implemented in fast cache or by expanding the register file and reserve memory space for the intermediate buffer or buffers in the expanded register file.

It is also possible to start fetching and decoding instructions integrated with the execution of the current job, once the corresponding instruction start address has been transferred into the program counter in the register file. The decoded instructions may then be prepared for execution by loading the required input operands from the register file. This preparation of the instructions for execution may also be integrated with the execution of the current job.

Figure 6:
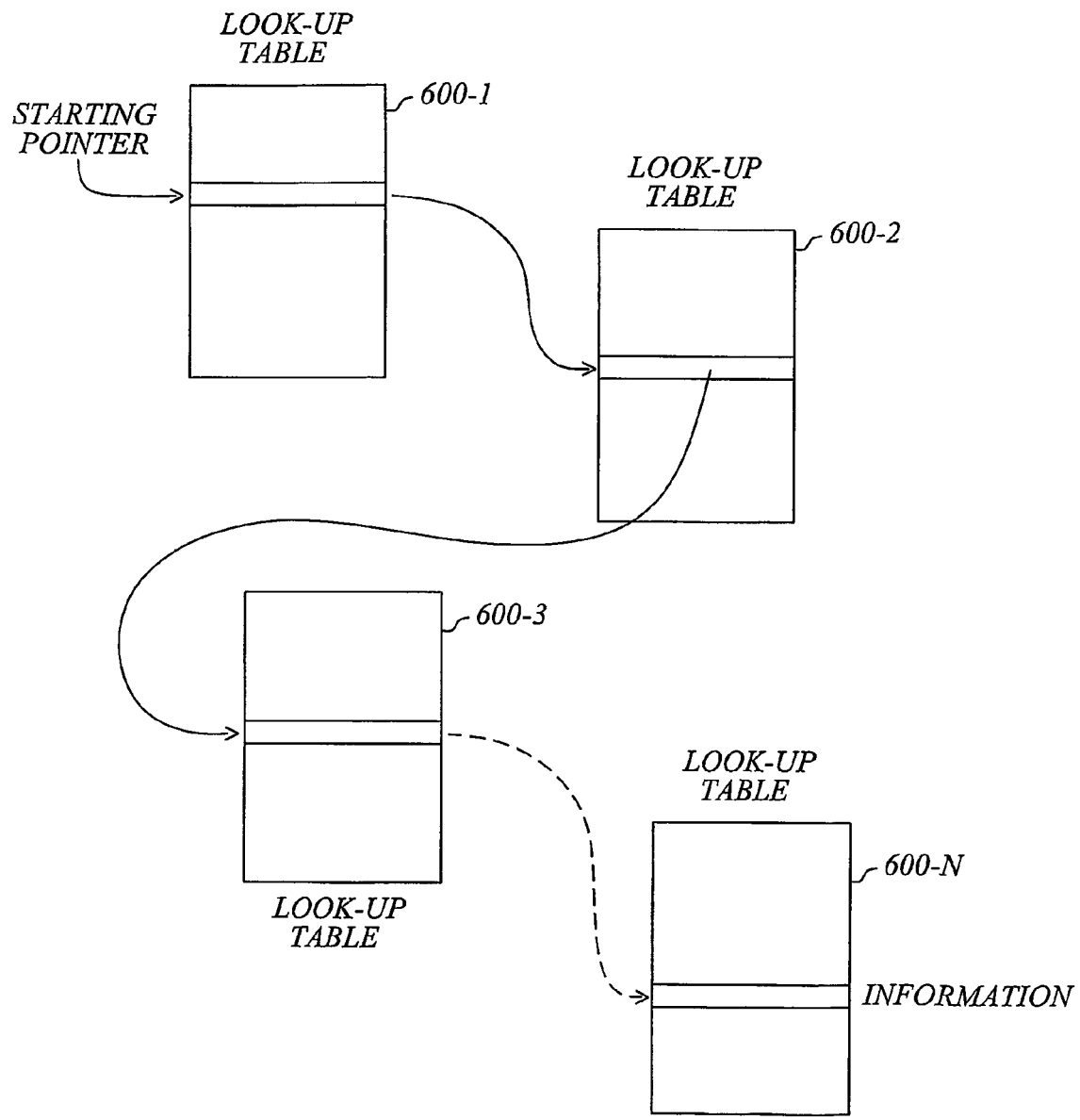
FIG. 6 is a schematic diagram illustrating the pointer-chasing problem in a linked data structure.

Depending on the system configuration, the job start preparation may also involve a number of table look-ups for determining the next job and for retrieving job information to be transferred to the register file. For example, in systems using dynamically linked code that can be reconfigured during operation, instruction start address information is generally accessed by means of several table look-ups in different tables. Each table look-up will lead to a given memory latency, and with a series of table look-ups the accumulated memory latency will be quite significant. This problem, which sometimes is referred to as the pointer-chasing problem, generally occurs in linked data structures whenever there is a pointer to a table or equivalent data structure 600-1 and that table holds a pointer to another table 600-2, which in turn holds a pointer to a further table 600-3 and so on until the information can be retrieved from a final table 600-N, as schematically illustrated in FIG. 6. For information on the pointer-chasing problem and different prior art techniques for handling linked data structures, reference is made to *A Prefetching Technique for Irregular Accesses to Linked Data Structures* by Karlsson et al., IEEE 1999, pp. 206-217.

In accordance with a further aspect of the invention, table look-ups are also performed integrated with the execution of the current job in order to hide the corresponding read latency. In general, the table look-ups do not compete for memory area in the register file and can therefore be integrated and executed at any place within the current job, independent of any compiler optimizations that are based on the register file utilization. Preferably, the table look-ups are executed as early as possible in the job in or to hide as much as possible of the read latency. However, if the accumulated memory access time for a series of table look-ups is much longer than the average job execution time, it is better to distribute the table look-ups over several preceding jobs and perform, integrated with the execution of each preceding job, a limited subset of the table look-ups.

This aspect of the invention offers great advantages in its own right, and can be practiced separately from the other read processes in the job start preparation of a future job. For optimal performance, however, the integrated table look-ups are preferably combined with integrated register file updating and integrated instruction fetching and preparation.

It should also be understood that the job start preparation integrated with the current job may be related to more than one future job, and that different stages of job start preparation are executed for different future jobs. For example, job information related to the most immediate future job, the next job, may be read into the register file, while a table look-up in a series of table look-ups for a more distant future job is performed concurrently.

Figure 7:
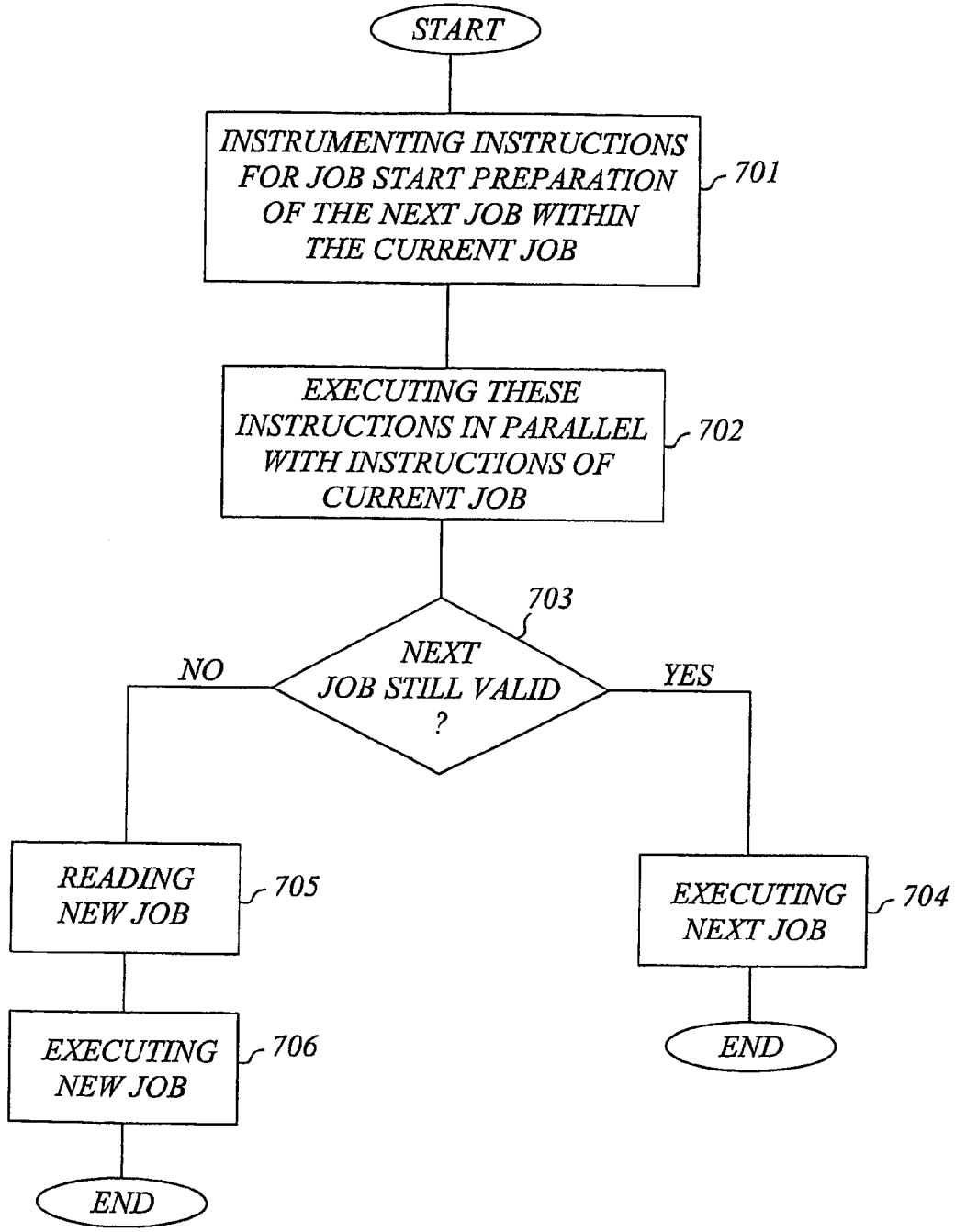
FIG. 7 is a schematic flow diagram of a method for reducing the job start preparation time according to a preferred embodiment of the invention.

FIG. 7 is a schematic flow diagram of a method for reducing the job start preparation time according to a preferred embodiment of the invention. Instructions for job start preparation of the next job are instrumented into the current job in step 701. In step 702, these instructions are dispatched and executed by the processor in parallel with the instructions of the current job so as to integrate the job start preparation for the next job into the current job. If the scheduled job order in the job message queue is allowed to change during execution, the job start preparation of the next job will be speculative since the "next job" that is being prepared may be withdrawn or replaced by a new job before it is ready for execution. It is thus necessary to determine, in step 703, whether the next job is still valid before starting the execution of the next job. If the next job is valid (YES), execution is initiated in step 704. If the next job is not valid (NO), for example because it has been replaced by a new job with higher priority, the speculated "next job" will not be executed. Instead, the register file content will be flushed and replaced by the necessary information belonging to the new job, in step 705. Once the new job has been read into the register file and the instructions corresponding to the new job have been prepared, execution is initiated in step 706. The test in step 703 may also be designed to cover the case when there is no next job ready during execution of the current job, or when the next job is a non-standard job.

The validity test is preferably, although not necessarily, integrated with the execution of the current job. The test may be integrated in full, or as simply as a call for an operating system routine or a call for a hardware-implemented test.

If the next job is withdrawn and replaced by a new job during execution of the current job, an operating system routine, or possibly dedicated hardware, may be used for copying the new job into the register file.

Similarly, if the next job is a non-standard job the normal execution of the next job is inhibited, and instead a special operating system routine, or hardware, may be used for handling the non-standard job.

The job start preparation time will thus be reduced only when the speculation concerning the next job is successful. Hence, the invention should be used with care in applications with frequent priority level changes and/or job withdrawals. However, in applications with few priority level changes and withdrawals, the invention offers great improvements in performance.

In order to simplify the compiler design and to optimize the performance, the compiler may use an instruction-scheduling algorithm that places instructions for job start preparation in the most common execution path. The most common execution path is detected by statistical measurements, and the compiler then confines the job start preparation of the next job to the detected path. This means that if the actual execution path of the current job and the integrated instructions for job start preparation departs from the most common execution path, for example because of a conditional jump, a dedicated operating system routine is called for handling the job start preparation. On the other hand, if the actual execution path is the same as the most common execution path, the next job will be properly prepared at the end of the execution path. For general information on scheduling of instructions in the most common execution path, reference is made to the article *Code Layout Optimizations for Transaction Processing Workloads* by A. Ramirez et al., IEEE 2001, pp. 155-164.

The invention is not only applicable to message-based systems such as PLEX, OSE or VRTX but also applicable to process-based computer systems. For example, many commercial operating systems such as Unix and Windows NT work with processes. In a system having an execution model based on processes, incoming signal messages originating from events in the system or from communication messaging are directed to corresponding processes. A process is normally represented by its process control block, which holds the process state when the process is not executing and possibly administrative information required by the operating system. The process state includes program address information and register information required for execution of the current job of the process. A process can be either READY, waiting in a ready queue for execution, EXECUTING, meaning that a job is executed based on the current process state of the process control block, or BLOCKED, waiting for a required signal message in a blocked queue.

In analogy with the previously described embodiments of the invention, the read latency for performing table look-ups and/or updating the register file between processes can be hidden within the job of the currently executing process. For example, any of the table look-ups in the ready queue, the process control block and other tables for retrieving an instruction start address may be integrated in parallel with the job belonging to the currently executing process, or distributed over a number of preceding processes. Integrated register file updating is basically accomplished by copying, in parallel with the job belonging to the currently executing process, the process state of the next job belonging to the next process in the ready queue into the register file of the processor.

For additional information on process-oriented operating systems and execution models, please refer to *Operating System Concepts* by Silberschatz and Peterson, Addison-Wesley Publ. Co., 1988, pp. 149-185.

The embodiments described above are merely given as examples, and it should be understood that the present invention is not limited thereto. Further modifications, changes and improvements which retain the basic underlying principles disclosed and claimed herein are within the scope and spirit of the invention.

The invention claimed is:

1. A method for job start preparation in an instruction-parallel processor system having an instruction-parallel processor, said method comprising the steps of:

executing, in parallel with the execution of instructions of a current job by the instruction-parallel processor, read instructions for job start preparation for at least one next job arranged in a queue of jobs to be executed, wherein the executing step includes:
  determining whether part of a register file of the instruction-parallel processor is no longer being utilized by the instructions of the current job; and
  responsive to determining that part of the register file is no longer being utilized by the instructions of the current job:
    reading job information related to the next job from a memory; and
    storing the job information in the part of the register file of the instruction-parallel processor that is no longer being utilized by the instructions of the current job;
fetching, integrated with the execution of instructions of the current job, instructions related to the next job based on instruction address information in said job information; and decoding and preparing, integrated with the execution of instructions of the current job, the fetched instructions for execution;

wherein the executing step is performed prior to completion of the current job, thereby hiding within the current job, a read latency associated with the next job.

2. The method according to claim 1, wherein the job read instructions for job start preparation include table look-up information for job start preparation of the next job or a more distant future job.

3. The method according to claim 2, further comprising:

distributing a series of table look-ups that are required for job start preparation of a future job over a number of preceding jobs, and performing, integrated with the execution of each one of said preceding jobs, a respective subset of said table look-ups.

4. The method according to claim 1, wherein said read instructions are pre-loaded from a slower memory to a faster intermediate memory buffer prior to the execution of the current job, and the read instructions are read from the intermediate memory buffer into the register file integrated with the execution of the current job.

5. The method according to claim 1, wherein said read instructions include at least one of instruction address information and input arguments for the next job.

6. The method according to claim 1, wherein said read instructions are integrated with the instructions of the current job by a compiler, and wherein the instruction-parallel processor is a Very Long Instruction Word (VLIW) processor and the compiler is a parallelizing VLIW compiler.

7. The method according to claim 1, further comprising:

determining before starting execution of the next job, whether the next job is still valid as the next job; and starting execution of the next job only if it is determined as valid.

8. The method according to claim 7, wherein said determining step is also integrated with the execution of the current job.

9. The method according to claim 8, further comprising:

reading the a new job to a register file if the next job has been withdrawn and replaced by the new job; and starting execution of the new job.

10. The method according to claim 8, further comprising:

inhibiting normal execution of the next job if it is determined as a non-standard job, and calling an operating system routine for handling the non-standard job.

11. The method according to claim 1, wherein instructions for job start preparation of the next job are integrated with the instructions of the current job and scheduled in the most common execution path of the processor, and an operating system routine for job start preparation of the next job is called if the actual execution path of the current job departs from the most common execution path.

12. A system for job start preparation in an instruction-parallel processor system, comprising:

an instruction-parallel processor;

a memory for storing job information for a plurality of jobs to be executed by the instruction-parallel processor; and means for executing, in parallel with the execution of instructions of a current job by the instruction-parallel processor, read instructions for job start preparation for at least one next job in the plurality of jobs to be executed, wherein the means for executing includes:

means for determining whether part of a register file of the instruction- parallel processor is no longer being utilized by the instructions of the current job; and means, responsive to determining that part of the register file is no longer being utilized by the instructions of the current job, for reading job information for the next job from the memory and for storing the job information in a part of a register file of the instruction-parallel processor that is no longer being utilized by the instructions of the current job;

means for fetching, integrated with the execution of instructions of the current job, instructions related to the next job based on instruction address information in said job information; and means for decoding and preparing, integrated with the execution of instructions of the current job, the fetched instructions for execution;

wherein the executing means stores the job information in the register file prior to completion of the current job, thereby hiding within the current job, a read latency within associated with the next job.

13. The system according to claim 12, wherein the read instructions comprise table look-up information for job start preparation of the next job or a more distant future job.

14. The system according to claim 13, further comprising means for distributing a series of table look-ups that are required for job start preparation of a future job over a number of preceding jobs, and for performing, integrated with the execution of each one of said preceding jobs, a respective subset of said table look-ups.

15. The system according to claim 12, wherein said read instructions are pre-loaded from a slower memory to a faster intermediate memory buffer prior to the execution of the current job, and that said job information is read from the intermediate memory buffer into the register file integrated with the execution of the current job.

16. The system according to claim 12, wherein said read instructions include at least one of instruction address information and input arguments for the next job.

17. The system according to claim 12, wherein said read instructions are integrated with the instructions of the current job by a compiler and wherein the instruction-parallel processor is a Very Long Instruction Word (VLIW) processor and the compiler is a parallelizing VLIW compiler.

18. The system according to claim 12, further comprising:

means for determining, before starting execution of the next job, whether the next job is still valid as the next job; and means for starting execution of the next job only if it is determined as valid.

19. The system according to claim 18, wherein the means for determining whether the next job is still valid is realized by execution of instructions that are integrated with the instructions of the current job.

20. The system according to claim 19, further comprising:

means for reading, if the next job has been withdrawn and replaced by a new job, the new job to the register file; and means for starting execution of the new job.

21. The system according to claim 19, further comprising means for inhibiting normal execution of the next job if it is determined as a non-standard job, and calling an operating system routine for handling the non-standard job.

22. The system according to claim 12, wherein read instructions for job start preparation of the next job are integrated with the instructions of the current job and scheduled in the most common execution path of the processor, and an operating system routine for job start preparation of the next job is called if the actual execution path of the current job departs from the most common execution path.

* * * * *

UNITED STATES PATENT AND TRADEMARK OFFICE
CERTIFICATE OF CORRECTION

PATENT NO. : 7,565,658 B2 Page 1 of 1
APPLICATION NO. : 10/491880
DATED : July 21, 2009
INVENTOR(S) : Ericsson et al.

It is certified that error appears in the above-identified patent and that said Letters Patent is hereby corrected as shown below:

In Column 7, Line 43, delete "thin" and insert -- than --, therefor.

In Column 11, Line 7, in Claim 2, before "read" delete "job".

In Column 11, Line 40, in Claim 9, after "reading" delete "the".

Signed and Sealed this

Twenty-fourth Day of November, 2009

David J. Kappos
*Director of the United States Patent and Trademark Office*